United States Patent
Hochart

[11] Patent Number: 5,832,423
[45] Date of Patent: Nov. 3, 1998

[54] METHOD AND DEVICE FOR DIGITALLY PROCESSING MEASUREMENTS OBTAINED FROM ONE OR MORE SENSORS

[75] Inventor: Jean-Pierre Hochart, Avelin, France

[73] Assignee: Sarl: Regipart, Avelin, France

[21] Appl. No.: 648,585

[22] Filed: May 16, 1996

[51] Int. Cl.⁶ .................................................. G01K 7/00
[52] U.S. Cl. ...................................... 702/188; 395/200.6
[58] Field of Search ..................... 364/132, 141, 364/551.01, 550, 570, 131, 133–138, 505, 506, 492, 493; 395/285, 286, 200.6–200.67; 340/823.06–823.13, 825.19; 707/200; 370/466, 467, 469

[56] References Cited

U.S. PATENT DOCUMENTS

| | | | |
|---|---|---|---|
| 4,688,170 | 8/1987 | Waite et al. | 364/200 |
| 4,949,299 | 8/1990 | Pickett | 364/900 |
| 4,972,463 | 11/1990 | Danielson et al. | 364/132 |
| 4,991,123 | 2/1991 | Casamassima | 364/550 |
| 5,428,555 | 6/1995 | Starkey et al. | 364/551.01 |
| 5,572,724 | 11/1996 | Watanabe et al. | 395/616 |
| 5,602,744 | 2/1997 | Meek et al. | 340/870.02 |

*Primary Examiner*—James P. Trammell
*Attorney, Agent, or Firm*—Harrison & Egbert

[57] ABSTRACT

The present invention relates to a method and a device for digitally processing measurements obtained from one or more sensors (1), wherein:

there are provided:
  at least one sensor (1), capable of taking measurements concerning the state of a plant, having at least one digital communications protocol capable at least of transmitting the measurements taken in the form of blocks composed of bytes defining fields of a given type;
  at least one digital processing unit (4);

the type of the said fields is parameterized, in an initialization phase, for each of the bytes composing the block or blocks of the communications protocol; and in the operating phase:
  the blocks sent by the sensor (1) are decomposed, byte by byte, as a function of the parameterization defined in the initialization phase, and they are reconstituted with a view to delivering a message remotely utilizable by at least one plant monitoring unit (6).

9 Claims, 3 Drawing Sheets

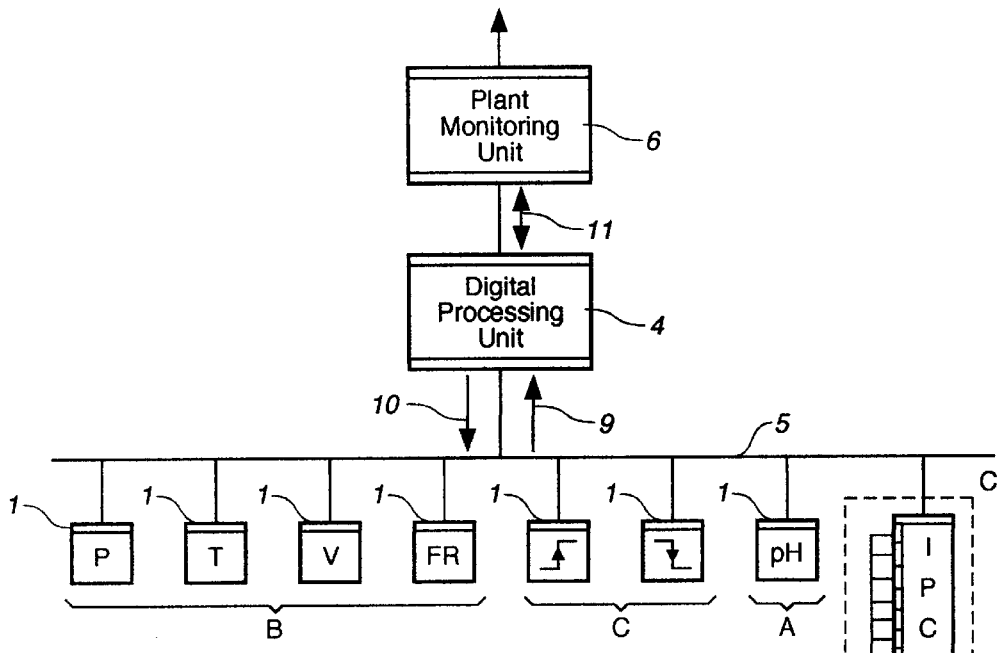
FIG. 1
FIG. 3
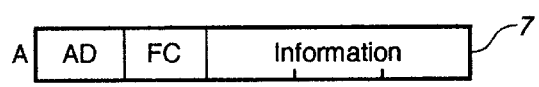
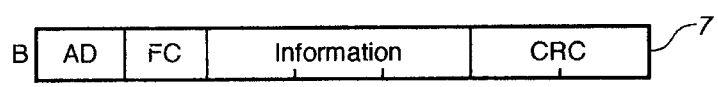
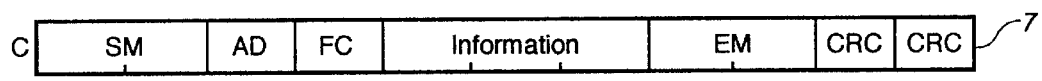
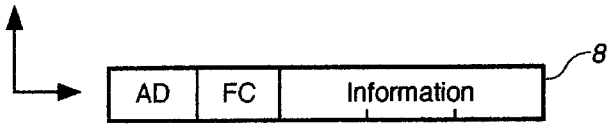

METHOD AND DEVICE FOR DIGITALLY PROCESSING MEASUREMENTS OBTAINED FROM ONE OR MORE SENSORS

TECHNICAL FIELD

The present invention relates to a method an device for digitally processing measurements obtained from one or more sensors.

BACKGROUND ART

It will find an application, in particular, in all the fields of economic activity in which continuous or discontinuous industrial production plant is to be found. It can thus be used, for example, in the chemical, farm produce and manufacturing industries, in energy production, transport or distribution, as well as other fields.

For many years, in all of these sectors, such plant has been equipped with numerous sensors to enable its condition to be monitored. It is to be noted that there is, at the present time, a tendency to make these sensors increasingly "intelligent". Indeed, thanks to internal computing and digital processing capabilities, for instance, these sensors are integrating more and more functionalities.

Thus, for many of them, the accuracy, unit and interval in which the measurements have to be carried out are parameterizable. Some sensors also, for example, enable calculations relating, for instance, to averages, standard deviations or others values to be carried out. They can also provide, among others, offsets, or even capabilities for internally memorizing the measurements effected.

Similarly, particularly in the case of elements connected with logic type information, the measurements are often centralized in devices such as, for example, automata or controllers, which then form, as mentioned above, "intelligent" sensors.

Furthermore, for different reasons, such as, for example, cost cutting or security constraints, it is generally wished to reduce the number of operators present on industrial production sites.

For this purpose, it is necessary to centralize the processing of the measurements taken by the sensors. It is also wished, in certain cases, to be able to remotely monitor the said measurements.

For these different reasons, the majority of the sensors henceforth encountered in industrial production plant are capable of sending and receiving messages for the exchange of information. Given the great diversity of the information liable to be sent or received by the sensors, as indicated earlier, the structure of such messages is complex.

One of the primary difficulties experienced by a man of the art in the monitoring of his industrial plant thus resides in the processing of the said messages. Indeed, each message has its own particular structure, which varies from one family of sensors to another. Thus, the communications protocols used by the sensors are extremely varied, and cannot be interpreted in any one way.

A first solution is to opt for a single family of sensors, for example sensors of the same origin. Since all the messages are then of the same structure, they can be interpreted and used.

Nonetheless, the equipment developed for that purpose can only be used with this one type of sensor and cannot be used on a wide scale; it is thus particularly expensive to develop.

In addition, one single family only rarely features all the types of sensor that are needed to equip a plant so as to be able to monitor it. The man of the art is thus compelled, either to do without certain information, or to introduce a new sensor that has a communications protocol that is different from the first one. We are then faced once again with the initial problem.

Another solution is to use a processing method offering, thanks to a data base, a fixed list of communication protocols. In this case, at the time of plant start-up, each of the sensors is provided with its own particular communications protocol.

While this solution permits a wider choice of sensors, it is nonetheless unsatisfactory. The data base offers, in fact, only a limited number of communications protocols. We are thus once more faced with the problems mentioned above, namely, for instance, either of having to do without certain items of information or of introducing a sensor the communications protocol of which does not feature in the data base.

The object of the present invention is to provide a method and a device for digitally processing measurements obtained from one or more sensors and which overcome the aforementioned drawbacks and make it possible to remotely deliver the measurements taken by the said sensors, whatever their communications protocol.

Another object of the present invention is to provide a method and a device for digitally processing measurements obtained from one or more sensors and which enable the measurements taken by the said sensors to be delivered in a homogenous manner, whatever their communications protocol.

Another object of the present invention is to provide a method and a device for digitally processing measurements obtained from one or more sensors and which enable the measurement characteristics of the said sensors to be remotely parameterized, whatever their communications protocol.

Another object of the present invention is to provide a method and a device for digitally processing measurements obtained from one or more sensors and which enable the measurement characteristics of the said sensors to be parameterized in a homogenous manner whatever their communications protocol.

Another object of the present invention is to provide a method and a device for digitally processing measurements obtained from one or more sensors and which enable the reading of the measurements taken by the said sensors and/or their parameterization to be centralized on a single medium.

Another object of the present invention is to provide a method and a device for digitally processing measurements obtained from one or more sensors and which enable a plant to be monitored, whatever the type of medium used.

Another object of the present invention is to provide a method and a device for digitally processing measurements obtained from one or more sensors and which are simple to implement and operate.

Further objects and advantages of the present invention will emerge in the course of the following description, which is provided only by way of illustration and is not intended to limit same.

SUMMARY OF THE INVENTION

The present invention relates to a method for digitally processing measurements obtained from one or more sensors, wherein:

there are provided:

at least one sensor, capable of taking measurements concerning the state of a plant, having at least one digital communications protocol capable at least of transmitting the measurements taken in the form of blocks composed of bytes defining fields of a given type;

at least one digital processing unit;

the type of the said fields is parameterized, in an initialization phase, for each of the bytes composing the block or blocks of the communications protocol, and in the operating phase:

the blocks sent by the sensor are decomposed, byte by byte, as a function of the parameterization defined in the initialization phase, and they are reconstituted with a view to delivering a message remotely utilizable by at least one plant monitoring unit.

The present invention also relates to a device designed for implementing the method, mentioned earlier, for digitally processing measurements obtained from one or more sensors, wherein there are provided:

at least one sensor, capable of taking measurements concerning the state of a plant, having a digital communications protocol capable at least of transmitting the measurements taken in the form of blocks composed of bytes defining fields of a given type;

at least one digital processing unit, the said digital processing unit comprising:

means for parameterizing the type of the said fields for each of the bytes composing the block or blocks of the communications protocol;

means for decomposing the blocks sent by the sensor, byte by byte, as a function of the parameterization defined, and for reconstituting them with a view to delivering a message remotely utilizable by at least one plant monitoring unit.

The present invention will be more clearly understood upon studying the following description, accompanied by the annexed drawings, which form an integral part thereof.

BRIEF DESCRIPTION OF THE DRAWINGS

FIG. 1 provides, in schematic form, an example of a set of sensors, monitoring the state of a plant, for which a digital processing method according to the invention can be implemented;

FIG. 3 schematically represents examples of communications protocol block structures used by the sensors shown in FIG. 1;

DETAILED DESCRIPTION OF THE INVENTION

Figure 2:
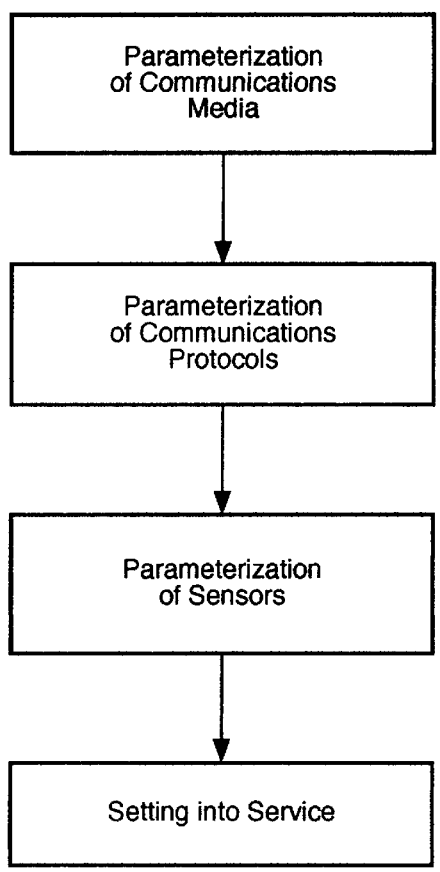
FIG. 2 illustrates, in the form of a flow diagram, an example of implementation of the digital processing method according to the invention.

The present invention relates to a method for digitally processing measurements obtained from one or more sensors.

It will find an application, in particular, in all the fields of economic activity in which continuous or discontinuous industrial production plant is to be found. It can thus be used, for example, in the chemical, farm produce and manufacturing industries, as well as, for instance, in energy production, transport or distribution.

As shown in FIG. 1, the method according to the present application relates to the digital processing of measurements obtained from one or more sensors 1. Thus, according to the invention, there is provided at least one sensor 1, capable of taking measurements concerning the state of a plant, in particular an industrial production plant, in order, for example, to be able to monitor its state.

The sensors may be such as those in families A and B, permitting the taking of analog type measurements such as, for instance, measurements of pressures, temperatures, volumes, flow rates, concentrations or other measurements, just as they may be sensors such as those in family C, enabling measurements of a logic type such as, for instance, those concerning the overstepping of threshold values, travel limits, etc. to be taken.

To be able to provide information on the plant whose state is monitored by them that is as efficient as possible and as detailed as possible, the sensor or sensors 1 may have internal computing and digital processing capabilities. Thus, for example, their degree of accuracy and their unit and/or interval of measurement may be adjustable. In addition, they may, for instance, enable computing results to be supplied for measurements carried out, such as for averages, standard deviations or others. They may also offer, among others, capabilities for offset or internal memorization of the measurements taken.

To be able to deliver all of this information to the outside world, the sensor or sensors 1 have at least one digital communications protocol capable at least of transmitting the measurements carried out in the form of blocks composed of bytes defining fields of a given type.

In this connection, it is to be noted, furthermore, that the present invention also relates to sensors 2, not having a digital communications protocol. For this purpose, they are connected, for example point to point, to digital processing means 3 such as, for instance, industrial programmable controllers.

The latter, which have at least one digital communications protocol capable at least of transmitting the measurements taken in the form of blocks composed of bytes defining fields of a given type, form, in association with a sensor 2, a sensor of the same type as that of sensors 1 as defined hereabove.

According to the method of the invention, there is also provided at least one digital processing unit 4. This is connected to sensors 1, for example, either point to point, or, as illustrated, by a digital communications network 5. The connection between the sensor or sensors 1 can, moreover, be either direct or indirect, and intermediate digital processing instruments, not shown, such as, for instance, controllers, concentrations of routers or others, can be provided.

According to the invention, during a first initialization phase, the type of the corresponding field is parameterized for each of the bytes composing the block or blocks of the communications protocol of the sensor or sensors 1.

Then, in the operating phase, the blocks sent by the sensor or sensors 1 are decomposed, byte by byte, as a function of the parameterization defined during the initialization phase, and they are reconstituted.

In this way a message is obtained that is remotely utilizable by at least one plant monitoring unit 6.

As to the latter, this can, for example, be a controller, just as it can be a conventional type microcomputer permitting the display of, and/or corrective action as a function of, the measures taken.

Thanks to the digital processing method according to the invention, it is thus possible, in an initial stage, to carry out remote monitoring of the plant for which it is implemented. It also makes it possible, according to one exemplary form of embodiment, to process the measurements obtained from sensors of different families.

According to this form of embodiment, there are, in fact, provided at least two sensors 1 capable of taking measurements concerning the state of a plant having different types of digital communications protocols capable at least of transmitting the measurements carried out in the form of blocks composed of bytes defining fields of a given type. At least the said digital processing unit 4 is also provided.

In the initialization phase, the type of the fields is parameterized, sensor by sensor, for each of the bytes composing the block or blocks of the communications protocols.

Then, in the operating phase, the blocks sent by each of the sensors is decomposed, byte by byte, as a function of the parameterization defined in the initialization stage, and they are reconstituted in a homogenous manner.

We thus obtain a message having a defined, single structure, utilizable by at least the said plant monitoring unit 6, whereas the sensors 1 have different types of digital communications protocols.

According to the different forms of embodiment of the method according to the invention, the sensors 1 send their information messages, either at their own initiative or in response to a question from processing unit 4.

According to this latter mode, the digital communications protocol or protocols of the sensor or sensors 1 are also capable of transmitting questions, sent by processing unit 4 to sensors 1, in the form of blocks composed of bytes defining fields of a given type.

As before, in order for sensors 1 to be able to interpret the messages sent to them, the type of the said fields is parameterized, in the initialization phase, sensor by sensor, for each of the bytes composing the communications protocol block or blocks.

Then, in the operating phase, there are provided messages for consultation of the sensor or sensors 1, including at least certain fields of their protocols, the said messages are decomposed, the corresponding blocks are reconstituted, byte by byte, as a function of the parameterization defined at the time of the initialization phase, and each block is sent to the sensor 1 concerned.

The consultation messages are sent, for example, remotely and/or in a homogenous manner, by monitoring unit 6, which transmits them to the digital processing unit 4 which, after decomposition and reconstitution, transmits them to sensors 1, in the format of a block the structure of which corresponds, for each of them, and despite their possibly heterogeneous nature, to that of their communications protocol.

According to an exemplary form of embodiment of the digital processing method according to the invention, in order to be able to define, remotely and/or in a homogeneous manner, the information mentioned hereabove such as, for instance, its calibration, at least one of sensors 1 has a communications protocol also capable of permitting the parameterization of its characteristics.

According to this form of embodiment, a parameterization message is sent, for example, prior to acquisition of the measurements, for instance, this message including at least certain fields of the communications protocol of the said sensor 1, the said message is decomposed, the corresponding block is reconstituted, byte by byte, as a function of its communications protocol, as defined in the initialization phase, and the block is sent to the said sensor 1. In this way, its measurement characteristics are parameterized.

One particular exemplary form of embodiment of a digital processing method according to the invention is illustrated in FIG. 2.

Thus, in an initial stage, the characteristics of the communications medium or media 5 are parameterized. The characteristics involved are, for instance, the network addresses of sensors 1, their communication speed, their parity, the nature of their stop bits, the existence of start and end of transmission signals, and others.

The block structure of the communications protocol is then parameterized for each sensor 1.

Once this first phase of definition of the characteristics of communication between sensors 1 and processing unit 4 is over, the measurement characteristics of sensors 1 may be parameterized, as applicable. For this purpose, messages permitting the updating of the data defined in sensors 1 are sent, according to the parameterization defined in the phase of definition of the structure of the communications protocols.

All of these parameters having being defined according to the operator's options, there then follows, for example, the operating phase. Thanks to the decomposition and reconstitution of the blocks of the communications protocols of sensors 1, carried out according to the parameterization defined in the initialization phase, these sensors can, despite their possibly heterogeneous nature, transmit remotely, and/or in a homogeneous manner, the measurements that they have carried out.

As shown in FIG. 3, the blocks, referenced 7, sent by or to the sensor or sensors 1 include, for example, at least a field AD defining the address of sensor 1 concerned, a field FC defining the function of the block and a field comprising information on the measurements and/or parameter values exchanged.

Thus, by way of example, according to the digital processing method of the invention, there is provided, for instance, at least one sensor 1 having a communications protocol A the block of which includes at least:
 a first byte representing the address of sensor 1,
 a second byte representing the function of the block,
 third, fourth and fifth bytes representing the measurements and/or parameter values exchanged.

There is also possibly provided at least one sensor 1 having a communications protocole B, the block of which includes:
 a first byte representing the address of the sensor,
 a second byte representing the function of the block,
 a given number of following bytes representing the measurements and/or parameter values exchanged,
 a second to last and a last byte, designated CRC (cyclic redundancy check), representing a test of correct block transmission.

There is also provided, for instance, at least one sensor 1 having a communications protocol C, the block of which includes:
 a first and a second byte representing a start of message transmission signal SMT, a third byte representing the address of the sensor concerned by the message, a fourth byte representing the function of the block;

a given number of following bytes representing the measurements or parameter values exchanged;

two following bytes representing an end of message transmission signal EMT, a byte representing a successful block transmission test, a final byte repeating the contents of the preceding one.

According to the invention, processing unit 4 makes it possible, as a function of the parameterization established in the initialization phase, defining the nature of each of the bytes of the communications protocol blocks, one on hand, to decompose and reconstitute, in a homogeneous manner, for example in the form of a message 8, blocks A, B, C sent by sensors 1 and, on the other hand, on the basis of a message 8, decomposed and reconstituted, to send blocks to sensors 1 using for each one its own communications protocol. These different transmissions are illustrated in FIG. 1 respectively by arrows referenced 9 and 10.

Messages 8 are exchanged, for example as illustrated by arrow 11, between processing unit 4 and monitoring unit 6. They include, for instance, as shown in FIG. 2, a first byte defining the address of sensor 1 concerned by the message, a second byte defining the function of the message, and a given number of following bytes including information on the measurements and/or the parameter values exchanged with sensor 1.

These messages 8 make it possible, for example, by means of dynamic exchanges of data between digital processing unit 4 and monitoring unit 6, to consult sensors 1 or to display their measurements, for instance, via a spreadsheet type software package.

Plant monitoring can thus be centralized, for example, on a single medium, this being possible whatever its communications protocol. In fact, the structure of message 8 can be defined at will by the operator. It can thus be adapted to any type of monitoring unit 6.

It should be noted, in this connection, that the structure of the blocks of the communications protocols of sensors 1 and/or the structure of messages 8 is/are, most often, indicated by the makers of the equipment in question. When this is not the case, tools known to the man of the art, such as block analyzers, can be used to determine the nature of the different bytes encountered.

The structure of the blocks of the communications protocols of sensors 1 can thus be described, in the initialization phase, by an operator who, according to the invention, indicates, sensor by sensor, byte by byte, the nature of each of the latter.

It is to be noted that the number and the nature of the bytes of the fields including the information on the measurements and/or parameter values exchanged depend on the function of the block and/or on the nature of the transmitting device. Thus, the blocks sent by processing unit 4 to sensors 1, the so-called question blocks, having the function of reading information on the measurements and/or parameterizations carried out by a sensor 1, include, as regards the information field, for instance, one or two bytes designating the address, in the sensor 1 in question.

The corresponding blocks sent from sensors 1 to processing unit 4, the so called answer blocks, include, as regards their information field, for instance, a byte to designate the number of bytes read and/or one or two bytes for each of the values read.

In the case of parameterizing sensors 1, the write function is used. The question blocks then include, as regards their information field, for instance, one or two bytes to designate, in the sensor 1 in question, the address of the all or nothing item of information or of the first of the all or nothing items of information and/or of the word or of the first of the words to be parameterized, as well as one or two bytes for each of the parameterization values. The answer blocks then include, for example, as regards the information field, for instance, a byte defining the number of bytes modified as well as one or two bytes for each of the values parameterized.

Each of the cases mentioned above is defined during parameterization in the initialization phase. Decomposition and reconstitution of the corresponding blocks, during the operating phase, is also carried out according to the nature of the said functions and the origin of the said blocks.

Figure 4:
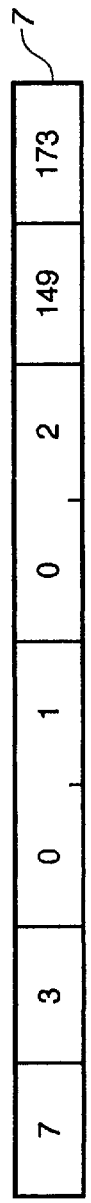
FIG. 4 provides a detailed example of a series of bytes composing blocks of one of the protocols shown in FIG. 2, exchanged by means of a digital processing method according to the invention.

FIG. 4 illustrates a particular example of question blocks and of answer blocks exchanged from a sensor 1 having a B communications protocol. More precisely, the object of the exchange of information is to be informed of the measurement taken by the sensor located at address No. 7, namely the temperature T sensor, as well as to indicate, for information, the temperature set point applied to the plant under observation.

As these two values are available at addresses Nos. 1 and 2 of the said sensor, the question block is composed of a series of bytes enabling the first two words contained in the sensor provided at address No. 7 to be read. The block ends with two bytes forming the value of the correct transmission test. In the particular example illustrated, the test is the one referred to as CRC 16, which is known to the man of the art.

In response to this question, sensor T sends an answer in which it indicates its address number, the function requested and then the number of bytes read and, distributed two by two in the following four bytes, the value of the measurement taken and the value of the corresponding set point. In these pairs of bytes, the first byte represents the high-order byte and the second the low-order byte. Here too, the message ends with two bytes giving the results of the correct transmission test.

Figure 5:
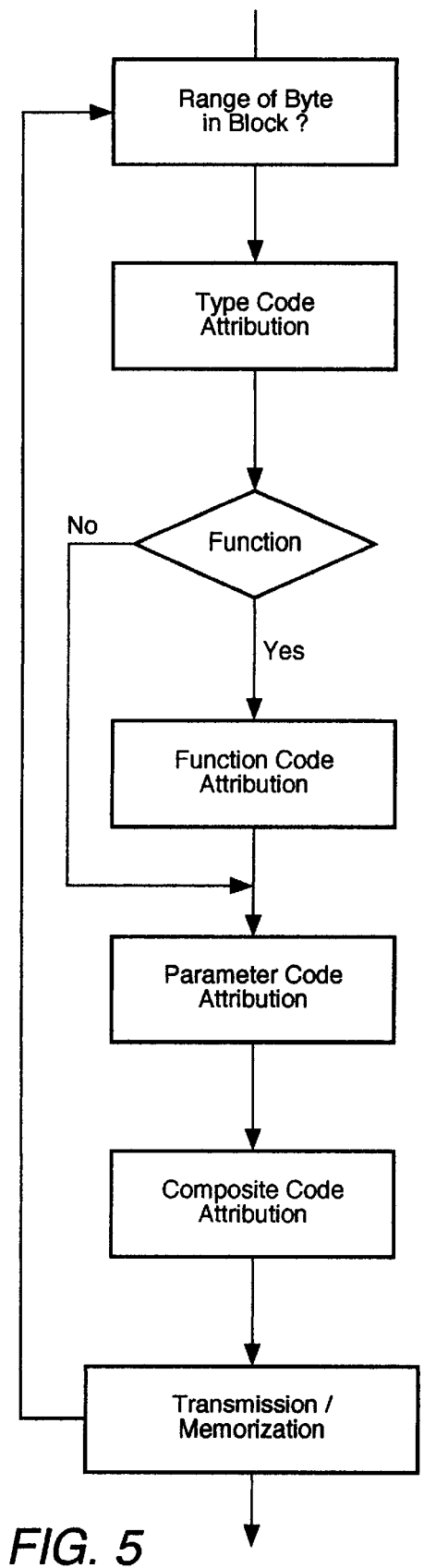
FIG. 5 illustrates, in the form of a flow diagram, a detail in a stage of a digital processing method according to the invention.

Of course, although this is not shown, the bytes take the form of a binary series formed of zeros and ones. FIG. 5 herebelow illustrates in detail an exemplary form of embodiment of the processing of the blocks of the communications protocols of sensor or sensors 1 according to the process of the invention. For each byte in a block, there is attributed firstly, for instance, a code defining its type. It is thus detected, for example, whether it is a start-of-block SMT (start of message transmission) byte, an end-of-block EMT (end of message transmission) byte, a sensor address AD (address) byte, a function FC (function) byte, a CRC (cyclic redundancy check) byte, a byte containing an address of information in the sensor, a redundancy byte, a byte containing the number of following words, a byte containing values, etc.

In the case of a function byte, the structure, mentioned hereabove, of the corresponding information field is attributed for each function.

The byte is also attributed, for instance, its different parameters, namely, for example, its different significant values, its length in bits, the need, if applicable, to take into account the following byte, its significance, etc.

Finally, before proceeding to process the following byte, a composite code is devised grouping together all of the information on type, functions and parameters previously defined. This information is then transmitted and/or memorized.

As to the initial step, according to a first form of embodiment, the structure of the blocks sent to the sensor or sensors 1 is parameterized, sensor by sensor, the structure of the blocks sent by the sensor or sensors 1 is defined, a question is defined, the sensor concerned is consulted, the answer is observed and the validity of the parameterization is checked.

According to another exemplary form of embodiment, the structure of the blocks sent to the sensor or sensors 1 is parameterized, sensor by sensor, a question is defined, the sensor concerned is consulted, the answer is observed and the structure of the blocks sent by the sensors is constructed.

According to this last form of embodiment, the parameterization of the structure of the answer blocks is thus carried out a posteriori, which enables all the special features, if any, of a given communications protocol to be taken into account.

During operation, according to one exemplary form of embodiment of the method according to the invention, a question block is sent to a sensor 1, the block sent in response by the sensor is waited for, and the following sensor is consulted, Digital processing of the measurements is thus carried out, for instance, according to the mode known to the man of the art as the "master-slave" mode. The exchanges between sensors 1 and processing unit 4 are, for example, asynchronous.

Decomposition and reconstitution of the blocks according to the parameterization defined in the initialization phase is effected, depending on the capabilities of processing unit 4, either in parallel with the exchanges of messages with sensors 1, or sensor 1 by sensor 1. The same applies to exchanges between processing unit 4 and plant monitoring unit 6.

Any transmission errors are detected, if applicable, for instance, through use of the CRC fields and/or by checking the size of the blocks sent and/or received.

The present invention also relates to a device designed to implement the method, mentioned earlier, for digitally processing measurements obtained from one or more sensors 1, wherein there is provided at least one sensor 1, capable of taking measurements concerning the state of a plant, having a digital communications protocol capable at least of transmitting the measurements effected in the form of blocks composed of bytes defining fields of a given type, as well as at least one digital processing unit 4.

According to the invention, the said digital processing unit 4 comprises at least means for parameterizing the type of the said fields for each of the bytes composing the block or blocks communications protocol of the sensor or sensors 1. It also includes means for decomposing the blocks sent by the sensor or sensors 1, byte by byte, as a function of the parameterization defined, and for reconstituting them with a view to delivering a message remotely utilizable by at least one plant monitoring unit 6.

It should be noted that, according to one particular form of embodiment, digital processing unit 4, hence the parameterizing means and the decomposing and reconstituting means, can be decentralized at each of sensors 1.

According to another form of embodiment, digital processing unit 4 and plant monitoring unit 6 are provided on one and the same medium.

As mentioned earlier, the links between processing unit 4 and sensors 1 are formed, for example, either on a point to point basis or using a communications network 5. The latter can be formed, for instance, by a physical medium known to the man of the art as an RS 232, an RS 422, a current loop, etc.

According to the different forms of embodiment of the device according to the invention, the parameterizing, decomposing and reconstituting means also make it possible, for instance, to deliver a homogeneous message usable by monitoring unit 6 of the plant, even if the latter includes at least two sensors having digital communications protocols of different types.

They also make it possible, if the communications protocols of the sensor or sensors 1 are adapted to such a use, for example, to send blocks of questions and, for instance, parameterization, to sensor or sensors 1.

It goes without saying that other embodiments, within the grasp of a man of the art, could have been contemplated without thereby departing from the scope of the present application.

I claim:

1. A method for digitally processing measurements concerning a state of a plant, the measurements being obtained from at least one sensor, a digital communications protocol is capable of transmitting the measurements taken by the sensor and of transmitting questions sent by a digital processing unit to the sensor, the questions being in a form of blocks composed of bytes defining fields of a given type, the method comprising the steps of:

parametizing the blocks in an initialization phase in a sensor-by-sensor and in a byte-by-byte manner;

decomposing the blocks sent by the sensor in an operating phase in a byte-by-byte manner as a function of the parametization defined in the initialization phase; and reconstituting the blocks in a byte-by-byte manner as a function of the parametization so as to deliver a message remotely utilizable by a plant monitoring unit.

2. The method of claim 1, wherein the sensor has at least two sensors having differing digital communication protocols, the method further comprising the steps of:

parametizing the type of the fields in the initialization phase in a sensor-by-sensor manner for each of the bytes composing the blocks of the digital communications protocol;

decomposing in the operating phase the blocks sent by each of the sensors in a byte-by-byte manner as a function of the parametization defined in the initialization phase; and reconstituting the blocks in a homogeneous manner as to deliver a message utilizable by the plant monitoring unit.

3. The method of claim 1, further comprising the steps of:

providing messages in the operating phase for consultation of the sensor, the messages having a certain field of the protocol;

decomposing the messages; and reconstituting the blocks corresponding to the messages in a byte-by-byte manner as a function of the parametization defined in the initialization phase, each block being transmitted to a desired sensor.

4. The method of claim 3, wherein at least one sensor has a communications protocol that permits a parametization of characteristics of the sensor, the method further comprising the steps of:

sending a parametization message prior to an acquisition of measurements, the parametization message including certain fields of the communications protocol;

decomposing the parametization message;

reconstituting the block corresponding to the parametization message in a byte-by-byte manner as a function of the communications protocol of the sensor and as defined in the initialization phase; and sending this block corresponding to the parametization message to the sensor so as to parametize measurements therein.

5. The method of claim 3, wherein the block sent by or to the sensor has a field defining an address of the sensor and has a field defining a function of the block and has a field with information on the measurements or parameter values exchanged.

6. The method of claim 3, further comprising the steps of:

parametizing in the initialization phase a structure of the blocks sent to the sensor in a sensor-by-sensor manner;

defining the structure of the blocks sent by the sensor in a form of answer blocks;

defining a question;

consulting a concerned sensor;

observing an answer block; and checking a validity of the parametization.

7. The method of claim 3, further comprising the steps of:

parametizing in the initialization phase a structure of the blocks sent to the sensor in a form of a question block in a sensor-by-sensor manner;

defining a question block;

consulting a concerned sensor;

observing an answer; and constructing a structure of an answer block sent by the sensor.

8. The method of claim 3, further comprising the steps of:

sending a question block to the sensor;

waiting for a block sent in response by the sensor, and consulting a following sensor.

9. A system for digitally processing measurements concerning a state of a plant comprising:

at least one sensor with at least one digital communications protocol means for transmitting measurements taken by the sensor and for transmitting questions sent by at least one digital processing unit to the sensor in a form of blocks composed of bytes defining fields of a given type, the digital processing unit comprising:

means for parametizing the type of the fields for each of the bytes comprising the block of the communications protocol of the sensor;

means for decomposing the blocks sent by the sensor in a byte-by-byte manner as a function of the parametization produced by said means for parametizing; and means for reconstituting the blocks so as to deliver a message remotely utilizable by a plant monitoring unit.

* * * * *